Figure 1:
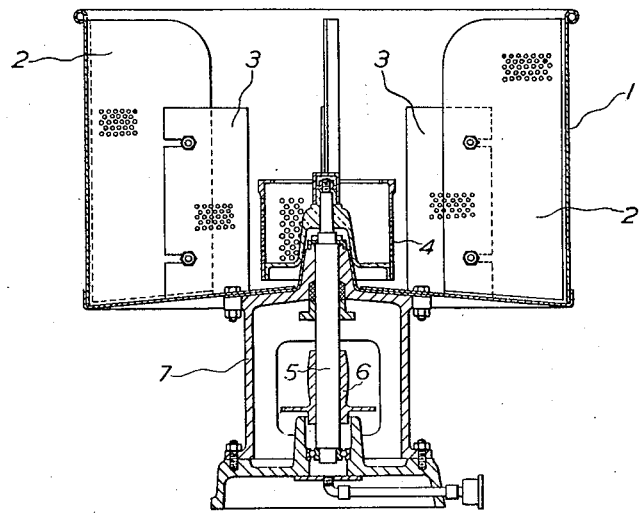

July 23, 1940.  J. E. JONES ET AL  2,208,637

MANUFACTURE OF CELLULOSE DERIVATIVES AND OTHER COLLOIDAL SUBSTANCES

Filed May 18, 1938

J. E. JONES
J. Y. DAVIES
J. F. NEILSON
INVENTORS

ATTORNEYS

Patented July 23, 1940

2,208,637

UNITED STATES PATENT OFFICE 2,208,637

MANUFACTURE OF CELLULOSE DERIVATIVES AND OTHER COLLOIDAL SUBSTANCES

John Edward Jones, James Young Davies, and John Francis Neilson, Spondon, near Derby, England, assignors to Celanese Corporation of America, a corporation of Delaware Application May 18, 1938, Serial No. 208,586
In Great Britain July 1, 1937

7 Claims. (Cl. 260—230)

This invention relates to improvements in the manufacture of cellulose derivatives and other colloidal substances, and particularly to improvements in precipitation of such substances from solution.

In the usual method employed for the manufacture of cellulose acetate the product on completion of the acetylation process is obtained in solution in acetic acid or other suitable solvent, and in order to separate it the solution is mixed with a precipitating agent, for example water or dilute acetic acid. The physical character of the precipitated cellulose acetate depends to a great extent upon the conditions under which precipitation is effected, for example the cellulose acetate may be obtained in a powdery form or in a horny granular form, neither of which is very desirable when it is subsequently to be redissolved, as is necessary, for example, in the manufacture of artificial filaments and similar products.

It has now been discovered that cellulose acetate may be precipitated from solution as a permeable fibrous mass, which is substantially free from powder and is very suitable for subsequent re-solution in acetone or other solvent, by feeding a solution of cellulose acetate in acetic acid or other suitable solvent into a rotating perforated cylindrical vessel, such as the cage portion of a hydro-extractor, which is surrounded by a suitable precipitating liquid, e. g., a 15–30% aqueous solution of acetic acid, so that the solution is forced out through the holes in the vessel into the liquid where it is precipitated. The precipitating liquid may be contained in a cylindrical chamber surrounding the rotating vessel, and preferably this chamber contains radial baffle plates extending from its outer edge to within a short distance of the perforated vessel. The baffles prevent the rotation of the perforated vessel from imparting a steady circular flow to the precipitating liquid and so reduce the tendency of the liquid to surge up the wall of the chamber and withdraw from the perforated vessel.

If the cellulose acetate solution to be precipitated is too viscous it may be diluted, preferably before it is introduced into the vessel. Thus a solution of cellulose acetate in acetic acid prepared by the acetylation of cellulose with acetic anhydride in the presence of sulphuric acid as catalyst may be diluted with a 15% or 30% aqueous solution of acetic acid until it has a suitable viscosity, and may then be fed into a rotating perforated vessel which is surrounded by a dilute solution of acetic acid, for example a 15% or 30% solution. Dilution with, and extrusion into, a 15% solution of acetic acid is found to give a denser, less fluffy precipitate than when 30% acid is employed.

While the best way of carrying out the invention appears to be to expel the solution of the substance to be precipitated through holes in a rotating perforated vessel surrounded by a precipitating liquid, it may also be carried out in other ways, the essential condition being that the solution shall emerge through small orifices into a precipitating liquid and that there shall be a relative motion between the liquid flowing through the orifices and the precipitating liquid which is substantially transverse to the direction of flow through the orifices. For example a solution of cellulose acetate may be fed into a vessel, the bottom of which is immersed in a stream of precipitating liquid, and the bottom may be perforated so that the solution emerges through the orifices into a precipitating liquid flowing in a direction substantially transverse to the direction of flow of the solution through the orifices.

The process may be carried out either as a batch process or continuously. Thus, for example, a rotating perforated vessel fed with a solution of cellulose acetate may be positioned in a cylindrical chamber, and precipitating liquid may be fed in at the top of the chamber and allowed to flow downward past the rotating vessel to the bottom of the chamber where it is withdrawn together with the precipitated cellulose acetate.

Figure 2:
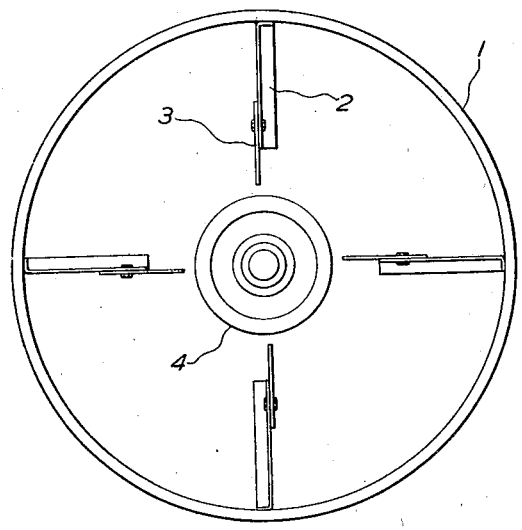

An apparatus which may be employed in carrying out the process of the present invention is illustrated in the accompanying drawing, wherein Figure 1 shows a sectional elevation of the apparatus, and Figure 2 is a plan view.

Referring to Figures 1 and 2 the apparatus comprises a cylindrical vessel 1 for precipitating liquid provided with fixed perforated baffles 2 and adjustable perforated baffles 3. The perforations in the adjustable baffles are so positioned that they can be made to coincide with the perforations in the fixed baffles. In the centre of the vessel is a perforated rotatable vessel 4 which is carried on a shaft 5 having a driving pulley 6. The whole apparatus is mounted on the frame 7.

In operation the inner perforated vessel 4 is filled with a solution of cellulose acetate or other colloidal substance and is rapidly rotated so as to expel the solution through the orifices into a precipitating medium contained in the vessel 1.

The present invention is particularly valuable in connection with the precipitation of cellulose acetate and other cellulose esters, for example cellulose propionate and cellulose butyrate, from their esterification solutions, but it is also applicable to the precipitation of cellulose derivatives from solutions in general, and also to the precipitation of other colloidal substances, for example rubber, polymerised vinyl esters, polymerised acrylic esters, bituminous materials and starch derivatives, from solutions thereof.

Having described our invention, what we desire to secure by Letters Patent is:

1. Process for the precipitation of colloidal substances from solutions thereof, which comprises rapidly rotating a body of solution of a colloidal substance which is surrounded by a precipitating liquid having motion relative to said body of solution and which is maintained out of contact with said precipitating liquid except at small areas whereat streams of said solution are allowed to escape under the centrifugal force directly into said precipitating liquid.

2. Process for the precipitation of colloidal substances from solutions thereof, which comprises rapidly rotating a body of solution of a colloidal substance which is surrounded by a body of precipitating liquid which has a lower speed of rotation about the axis of rotation than said body of solution and which is maintained out of contact with said precipitating liquid except at small areas whereas streams of said solution are allowed to escape under the centrifugal force directly into said precipitating liquid.

3. Process for the precipitation of colloidal substances from solutions thereof, which comprises rapidly rotating a body of solution of a colloidal substance which is surrounded by a precipitating liquid having motion relative to said body of solution and which is maintained out of contact with said precipitating liquid except at small areas whereat streams of said solution are allowed to escape under the centrifugal force directly into said precipitating liquid, said areas being moved about the axis of rotation of the said body of solution at a rate substantially equal to that of the adjacent solution.

4. Process for the precipitation of organic derivatives of cellulose from solutions thereof, which comprises rapidly rotating a body of solution of an organic derivative of cellulose which is surrounded by a body of precipitating liquid which has a lower speed of rotation about the axis of rotation than said body of solution and which is maintained out of contact with said precipitating liquid except at small areas whereat streams of said solution are allowed to escape under the centrifugal force directly into said precipitating liquid.

5. Process for the precipitation of cellulose acetate from solutions thereof which comprises rapidly rotating a body of solution of cellulose acetate which is surrounded by a body of precipitating liquid which has a lower speed of rotation about the axis of rotation than said body of solution and which is maintained out of contact with said precipitating liquid except at small areas whereat streams of said solution are allowed to escape under the centrifugal force directly into said precipitating liquid, said areas being moved about the axis of rotation of the said body of solution at a rate substantially equal to that of the adjacent solution.

6. Process for the precipitation of cellulose acetate from acetylation solutions thereof, which comprises rapidly rotating a body of an acetylation solution of cellulose acetate which is surrounded by dilute aqueous acetic acid having motion relative to said body of solution, and which is maintained out of contact with said aqueous acetic acid except at small areas whereat streams of said solution are allowed to escape under the centrifugal force directly into said aqueous acetic acid, said areas being moved about the axis of rotation of the said body of solution at a rate substantially equal to that of the adjacent solution.

7. Process for the precipitation of cellulose acetate from acetylation solutions thereof, which comprises rapidly rotating a body of an acetylation solution of cellulose acetate which is surrounded by a body of 15–30% aqueous acetic acid which has a lower speed of rotation about the axis of rotation than said body of solution and which is maintained out of contact with said aqueous acetic acid except at small areas whereat streams of said solution are allowed to escape under the centrifugal force directly into said aqueous acetic acid, said areas being moved about the axis of rotation of the said body of solution at a rate substantially equal to that of the adjacent solution.

JOHN EDWARD JONES.
JAMES YOUNG DAVIES.
JOHN FRANCIS NEILSON.